Sept. 17, 1935.  H. L. KRUM ET AL  2,014,938
MECHANICAL END-OF-LINE INDICATOR
Original Filed Feb. 18, 1933  2 Sheets-Sheet 1

INVENTOR
HOWARD L. KRUM
ALBERT H. REIBER
BY
H. B. Whitfield
ATTORNEY

Sept. 17, 1935.   H. L. KRUM ET AL   2,014,938
MECHANICAL END-OF-LINE INDICATOR
Original Filed Feb. 18, 1933    2 Sheets-Sheet 2
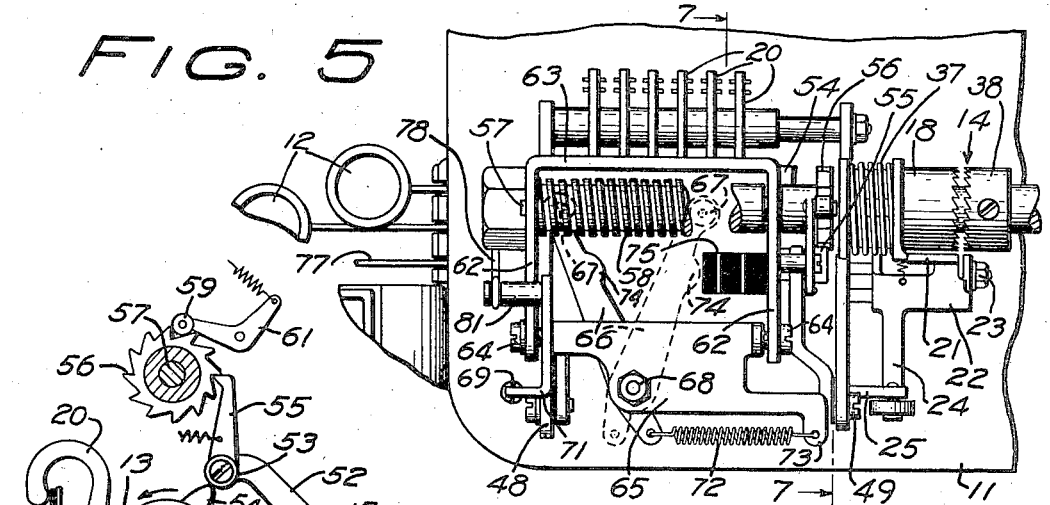
FIG. 5
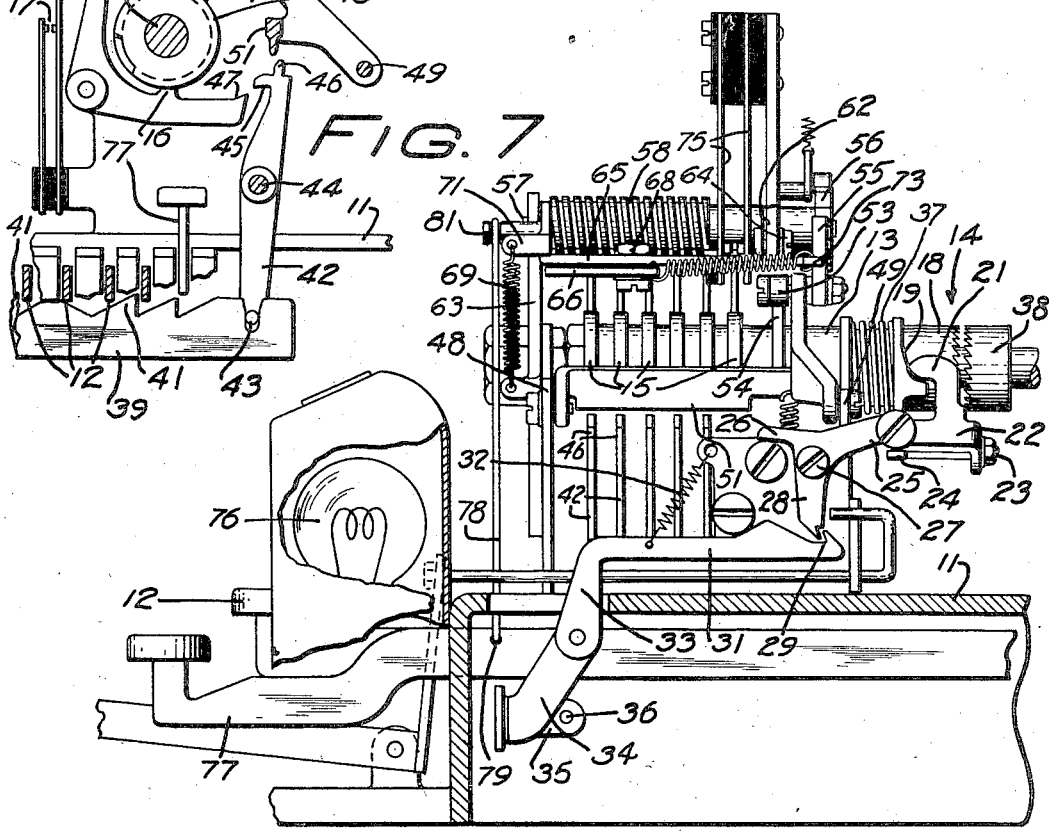
FIG. 7
FIG. 6
INVENTOR
HOWARD L. KRUM
ALBERT H. REIBER
BY
J. H. B. Whitfield
ATTORNEY Patented Sept. 17, 1935

2,014,938

UNITED STATES PATENT OFFICE 2,014,938

MECHANICAL END-OF-LINE INDICATOR

Howard L. Krum, Kenilworth, and Albert H. Reiber, Evanston, Ill., assignors to Teletype Corporation, Chicago, Ill., a corporation of Delaware Application February 18, 1933, Serial No. 657,364
Renewed October 24, 1934

17 Claims. (Cl. 178—25)

This invention relates to printing telegraph apparatus and more particularly to recording and indicating mechanism therefor.

One of the objects of the present invention is to provide a counting device that is particularly adaptable to printing telegraph mechanisms for indicating to a transmitting operator the number of operations made and to indicate by an alarm when a predetermined number of such operations have been consummated.

In the development of printing telegraph apparatus, two outstanding types of devices have come into general use, one in which the printing is effected upon a continuously moving strip of material and the printing mechanism is mounted on a stationary carriage, and the other wherein the printing is done on a relatively stationary material by a mechanism that is successively advanced with respect therewith. For a more comprehensive understanding an example of each of these classes of apparatus is contained respectively in U. S. Patent No. 1,745,633 and in copending application Serial No. 467,352, filed July 11, 1930.

While these two classes of devices differ both structurally and in their respective modes of operation, they are controllable, nevertheless, by substantially the same signal code excepting that carriage return signals are used with the latter type of devices generally referred to as "page" printers, whereas no such signals are necessary in the use of the former type of devices which are generally referred to as "tape" printers or tickers.

In accordance with the present invention, it is proposed to provide certain apparatus which will help to standardize communication practices whereby these two classes of devices may be connected in the same line circuit and be operated simultaneously, and by means of such apparatus any operator of a tape printer, wherein no carriage return signals are operatively essential, will habitually transmit a carriage return signal at the time and place where such signal would properly belong for a transmitter adapted solely for page printer operation.

Accordingly, the present invention comprises a counting mechanism that is particularly adapted to be applied to a tape printer such as, for example, the one referred to in the above patent, which will indicate by means of a premonitory signal when a predetermined number of keyboard operations have been consummated, which number of operations, when received by a page type printer, will complete the printing of a predetermined length of line.

Specifically, the present invention comprises a counting shaft that is rotated step-by-step under impetus received from a periodically operated portion of the principal printing mechanism. This counting shaft carries a worm which engages a travelling contact lever and moves the latter progressively with each operation thereof until said lever encounters a pair of contacts. A preferred form of the invention contemplates the use of a pair of such contacts which are normally closed, which are located in a circuit that also contains a tape illuminating lamp and which contacts, upon being encountered by the contact lever, open to break the circuit and extinguish the illuminating lamp which is normally lighted, thereby calling the operator's attention quite decisively to the fact that the predetermined number of operations have been performed and that a carriage return signal is due.

In accordance with a modified form of this invention, however, the pair of contacts are normally open and form part of a circuit in which is located a flash signal light normally extinguished, but which is timely lighted to denote the consummation of a predetermined number of keyboard operations. The difference between these two types of premonitory signals might properly be understood as constituting merely a matter of personal choice. It is, however, a noteworthy feature of this invention that either type of signal may be readily controlled by the mechanism constituting the present invention.

In accordance with a preferred practice also, the impetus for operating the counting shaft is received from a periodically rotating shaft located wholly within the transmitting mechanism of the printing device, supra, but in accordance with a modified practice, it is contemplated to receive this impetus from a periodically operated shaft located in the printing mechanism of the printer.

The particular utility of the last mentioned modification will be better understood with a knowledge of certain structural characteristics of the page as well as the tape printers. These features reside in the make-up of the printing units which comprise both transmitting and receiving apparatus whereby, regardless of which station is transmitting, a home record may be made simultaneously with the remote record, thereby enabling the local or calling station to check the message received at the remote or called station. However, a somewhat different situation arises when the unit at one station is a tape printer and the unit at the remote station is a page printer, in which event, it is necessary that the operator of the tape printer be apprised of the arrival of the end of a predetermined length of line of printing on the remote page printer. With such an arrangement, it is necessary that the operator of the tape printer be apprised continually, during periods of intercommunication with a page printer, of the relative position of the page printing type-carriage. This is accomplished by means of the last mentioned modification wherein the counting device is operated from a periodically operated shaft located in the printing mechanism of the tape printer. Since it is noted from the foregoing that the printing mechanism of the tape printer is actuated in accordance with outgoing messages as well as incoming messages, it is manifest that the counting device associated with the tape printing apparatus takes cognizance of operations performed not only by the tape printer but also by the remotely located page printer. Thus, for example, once intercommunication is established, the calling operator might transmit a message less in length than the predetermined length of line capable of being printed on the page printer, and the operator of the remote page printer may reply and upon so doing the counting device at the tape printer will, while printing is taking place, superadd the number of printing operations initiated by the remote page printer to the number already counted at the tape printer, the summation of which will represent the length of line printed on the remote page printer. Accordingly, irrespective of whether the carriage return signal is initiated at the tape printer station or at the remote page printer station, the counting device at the former station will respond thereto and be restored automatically to the beginning-of-line position.

With the foregoing and other objects in view, the present invention comprises the features herewith set forth and illustrated in the accompanying drawings, in which like reference characters designate similar parts throughout.

In the drawings, Fig. 1 is a fragmentary plan view of the selector mechanism which controls the operation of type bars in an apparatus similar to the one disclosed in U. S. Patent No. 1,745,633 issued to S. Morton et al., having applied thereto a counting mechanism embodying the features of the present invention;

Fig. 5 is a fragmentary plan view of a keyboard printer, such as is shown in Fig. 1, featuring the transmitter operating shaft and showing the present invention applied thereto;

Fig. 6 is a side sectional view taken approximately on line 6—6 of Fig. 5; and

Fig. 7 is a fragmentary detail section taken approximately on line 7—7 of Fig. 5.

Figure 1:
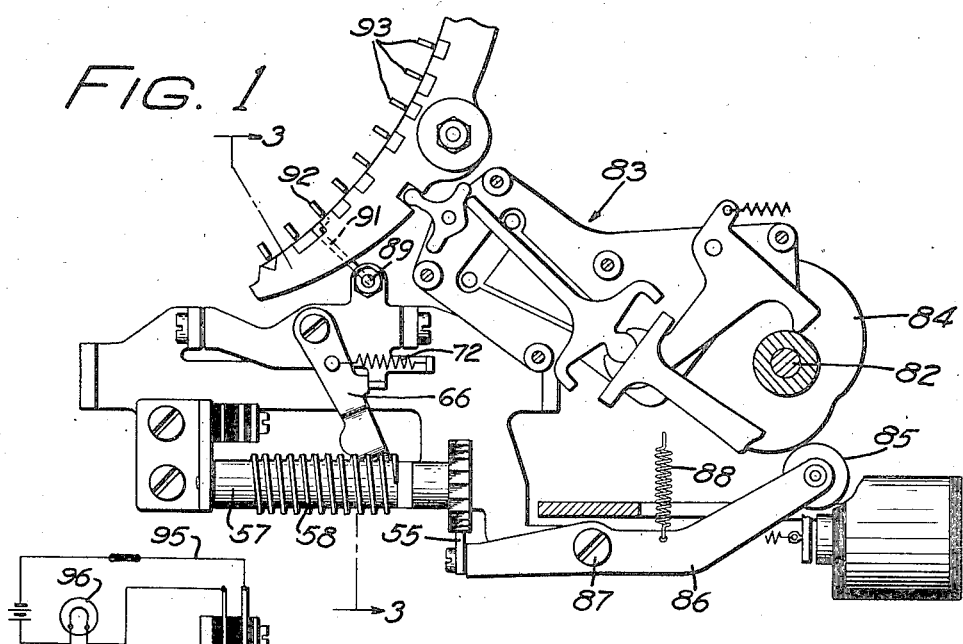

The preferred application of the present invention, as mentioned above, is illustrated in Figs. 5, 6 and 7, wherein the reference numeral 11 indicates generally a base casting within which are pivotally supported a set of keylevers 12 which constitute the manual control means of a transmitter mechanism and also the control means for a printing mechanism (not shown) for preparing a home record of the transmitted message.

A shaft 13 is driven through a clutch 14 from a constantly rotating source and is provided with a set of contact cams 15 each of which has a notched portion the several of which are arranged in a helical series so that as the cams are rotated the notches will successively cooperate with followers 16 of a series of contact levers 20. Each of the cams 15 acting upon a follower 16, Fig. 7, functions to close a pair of contacts 17 at a particular interval, individual to it during each operative cycle of the driven shaft 13. As each pair of the contacts 17 is closed, and dependent upon the particular signal transmitted, an electrical impulse is transmitted therethrough to the connected line circuit.

The driven portion 18 of clutch 14 has integrally formed therewith a cam surface 19 which cooperates with an extending portion 21 of a bell crank 22 pivoted at 23 and functions as a disengagement means. A laterally projecting arm 24 of bell crank 22 is engaged by one arm 25 of another bell crank member 26, which is pivoted at 27 and the other arm 28 of which cooperates by trigger engagement 29 with a release bar 31 normally urged by spring 32 towards its right-hand position, as viewed in Fig. 6. A depending portion 33 of bar 31 is pivotally connected to an upstanding arm 34 integrally formed with a universal bail 35 pivoted at 36. The latter member being disposed beneath the several keylevers 12 receives counterclockwise motion upon the operation of any of them and imparts this motion to bar 31, thrusting the latter leftwardly against the tendencies of its spring 32, causing it to rock bell crank lever 26 clockwise about its pivot by reason of its engagement at 29 therewith. This movement is ultimately imparted to the release member 22 for withdrawing its portion 21 from engagement with the driven member 18 of clutch 14, following which the latter member under influence of its spring 37 will be caused to engage the driving member 38 from which it will receive motion for rotating cam shaft 13 a single revolution, after which cam surface 19 will again be engaged by member 22 and driven portion 18 will again be withdrawn from driving engagement with member 38.

The several keylevers 12, which comprise the transmitting keyboard, are disposed parallel to each other above a set of permutation code bars 39 each of which is provided with an individual arrangement of variously inclined serrations 41. Upon depressing any keylever 12 its lower edge encounters the set of bars 39 and, depending upon the inclinations of the serrations peculiar to the bar, cams the several code bars rightwardly or leftwardly accordingly. The serrations of each bar 39 are individual to it and are so arranged with respect to those of the other bars, that the depression of each keylever 12 results in a placement or arrangement of the several bars 39 peculiar to that keylever.

To the right and above the several bars 39, as viewed in Fig. 7, are a corresponding set of locking levers 42 each individual to one of said bars and articulated to it by pin and slot engagements as at 43. Levers 42 are pivoted on a common shaft 44 and are formed at their upper extremities with overhanging lips 45 and locking projections 46. Extensions 47 formed integrally with the contact levers 20 are disposed in vertical alignment with the lips 45 of associated locking levers 42, while above the several levers 42 and pivotally supported at 48 and 49 is a locking bail 51 having a bar which is adapted to cooperate with the projections 46 of levers 42 as will be described presently. An extended portion 52 of bail 51 carries a follower roller 53 which cooperates with a cam 54 secured to shaft 13, and also a pawl 55 which cooperates with a ratchet wheel 56.

Ratchet wheel 56 is carried upon a short shaft 57 journalled above and parallel with respect to the driven shaft 13 previously described. A square threaded worm 58 is also carried by shaft 57 and is rotated counterclockwise by shaft 57 and ratchet 56, as viewed in Fig. 7, when the latter member is advanced step-by-step by its associated pawl 55 under the influence of cam 54 incident to each revolution of driven shaft 13. To prevent over-travel of ratchet wheel 56 when it is driven by pawl 55, a detent roller 59 carried by a spring loaded bell crank 61 is provided for engaging the ratchet teeth thereof.

Shaft 57 is journalled in the side frames of a supporting member 63, which are provided with laterally extending arms 62 through which protrude a pair of trunnion screws 64 for supporting a cradle 65. A contactor lever 66 is pivotally carried by cradle 65 at 68 and is provided at its end with a stub pin 67 especially adapted to reside between the thread walls of worm 58 and to follow therein rightwardly, as viewed in Fig. 5, when the worm is rotated by the action of pawl 56. A spring 69 engaging a projecting arm 71 of cradle 65 imposes a torque thereto and likewise to lever 66 maintaining pin 67 in engagement with the threads of worm 58, while a spring 72 connecting the opposite end of lever 66 with a securing post 73 integrally formed with cradle 65 serves to maintain lever 66 in its counterclockwise extremity, as indicated in solid lines. Lever 66 is provided with a lobe 74 which as it is moved toward its clockwise extremity engages the adjacent one of a pair of contacts 75, illustrated in broken lines, and in so doing, completes a circuit (not shown) within which is located a signal lamp 76 (Fig. 6) causing the latter to be lighted within the visual range of the operator for attracting attention thereby.

The exact time at which the lobe 74 of lever 66 encounters the contacts 75 for effectuating the alarm signal, just described, is dependent, of course, upon the number of teeth in wheel 56, the pitch of the threads of worm 58 and the relative location of the contacts 75, but since the ratchet wheel 56 and worm 58 do not lend themselves to ready adjustability, the relative location of the contacts 75 with respect to the travel of lever 66 may be suitably varied to adjust the timing of the signal.

Upon noticing the signal light, the transmitting operator is informed that a predetermined number of revolutions on the part of shaft 13 have been completed, and that a similar number of signals have accordingly been transmitted. Thereafter the operator will properly depress a carriage return keylever 77, preferably located toward the right of the keyboard, which lever, in addition to transmitting a corresponding signal to a remote station with which the particular apparatus is in communication, also restores contact lever 66 to its starting position in the following manner. A rod 78 is connected to the carriage return keylever at 79 and to a projecting pin 81 carried by cradle 65. Upon the depression of keylever 77, cradle 65 is rocked against the tendencies of its spring 69, which normally maintains the pin 67 of contact lever 66 in engagement with the threads of worm 58, withdrawing the pin so as to permit contactor lever spring 72 to at once return the lever 66 from any particular point in its travel to its normal or starting position, as described above. As carriage return keylever 77 is permitted to resume its normal position, cradle 65 and lever 66 are again free to respond to the action of spring 69, whereupon stub pin 67 is compelled to reseat itself within the threads of worm 58 assisted in part by the continued rotation of worm 58 upon resuming its movement during subsequent transmission.

Thus it will be understood that the operation of any of the keylevers 12 to initiate the transmission of any signal other than a carriage return signal causes the cyclic operation of shaft 13, which, through cam 54, imparts a reciprocal movement to locking bail 51. This motion translated through pawl 55 and ratchet 56, rotates the counting shaft 57 and worm 58 carried thereupon impulsively step-by-step advancing contact lever 66 until the lobe 74 thereof, by engaging contacts 75, completes the premonitory alarm circuit for apprising the operator that a predetermined number of character signals have been transmitted, which number corresponds to the number of characters in a full line of printing upon a page printer with which the transmitting operator may be in communication. The carriage return signal, which the operator transmits pursuant to the premonitory signal, controls the return of the movable printing carriage at the remote station to its beginning of line position in a manner that may be more fully understood by reference to the above mentioned co-pending application. Accordingly, the device of the present invention permits the page printer at the remote receiving station to be operatively controlled by a transmitting unit for tape printer.

*Modifications*

Figure 2:
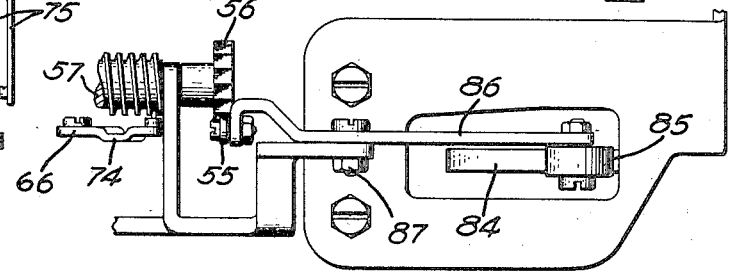
Fig. 2 is a fragmentary side elevation with parts broken away illustrating the mechanism of Fig. 1.
Figures 3, 4:
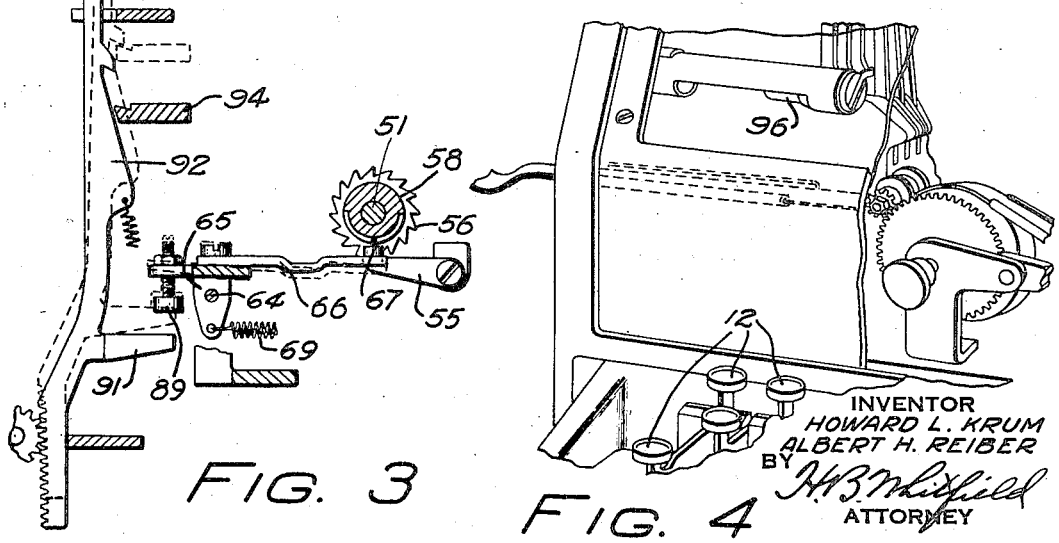
Fig. 3 is a detailed sectional view taken approximately on line 3—3 of Fig. 1.
Fig. 4 is a fragmentary perspective view of the exterior portion of a printing unit, such as is disclosed in Fig. 1, featuring the relative location of the keyboard and the illuminating lamp, which, in accordance with the present invention, also serves as a premonitory signal.

In Figs. 1 to 3, a counting mechanism similar generally to the one just described, is illustrated as applied to another portion of a printing unit such as the one described above and referred to in the U. S. patent supra.

Shaft 82 of Fig. 1 corresponds to the vertical operating shaft numbered 21 in Figs. 3 and 4 of U. S. Patent No. 1,745,633, mentioned above, which controls the operating and selecting mechanism indicated generally by the numeral 83 for controlling the stationary printing mechanism, while a cam 84 may correspond to cam 76 of the disclosure in the above patent or any other cam that is carried by shaft 21 and is rotated cyclically with each printing operation and with which the association of the present improvement will not interfere.

A follower roller 85 is carried by a lever 86 pivoted at 87 and is urged by a spring 88 into constant association with the periphery of cam 84. The opposite end of lever 86 carries a pawl which may be similar in shape and performance to the pawl 55 described above in connection with the preferred embodiment. The counting shaft 57 and its associated parts may correspond identically, so far as similar reference characters have been designated, to those of the preferred form which were described in the foregoing disclosure. Cradle member 65, however, instead of being articulated to the carriage return lever, is instead provided with an adjustable release screw 89 disposed above an especially provided extension 91 formed with selectable bar 92 which is selected in response to a received carriage return signal. The operation of bar 92 may have no other effect upon a tape printer than to space the printing; however, coincident with its selection and its selective operation, as in the case of any other of the selectable bars 93, it is moved upwardly by a common operating member 94 engaging through its extension 91 the adjustable screw 89 on cradle 65, rotating the latter about its pivot 64, Fig. 3, against the tendencies of spring 69 for withdrawing stub pin 67 from the threads of worm 58. When lever 66 is thus freed, its associated spring 72, Fig. 1, operates to return it to its normal position, as viewed in Fig. 1.

Thus it will be understood that the operation of the counting shaft 57 being mechanically associated with the vertical shaft 82 which controls the printing operation, responds not only to the transmitted signals as in the case of the preferred embodiment described above, but also in response to received signals to which the printing mechanism of the particular unit also responds.

As illustrated in Figs. 2 and 4, the contacts 75 with which the counting unit is associated, are in this case normally closed for maintaining the circuit 95 which includes the tape illuminating lamp 96 also closed. Upon being encountered by the lobe 74 of lever 66, the contacts 75 are parted, in this embodiment, opening the aforesaid circuit and extinguishing lamp 96.

Thus, a premonitory alarm is effected without the addition of another signalling medium, by utilizing a light that is already provided with a printing unit for illuminating purposes and extinguishing it upon the establishment of a predetermined condition. Through this practice the operator's attention is not only forcibly disturbed and arrested, but further operation indirectly prevented by placing the printed tape in darkness so that he may not continue conveniently without depressing the carriage return keylever 77 for restoring the contact lever 66 and reestablishing the circuit 95.

It will be understood, of course, that either type of premonitory signal may be associated with either application of the present invention, and also that numerous other modifications and variations may be made without departing from the spirit or scope of the present invention. For this reason it is not intended to be limited by any of the foregoing description, nor by the details of the accompanying drawings.

What is claimed is:

1. In a telegraph apparatus, a transmitting mechanism, a control mechanism for initiating signals to be issued over said transmitting mechanism, a helical element operated periodically with each operation of said control mechanism, reciprocating means receiving motion successively from said element and translating it progressively, and a signal means responsive to a predetermined progress of said first mentioned means for indicating the consummation of a predetermined number of operations of the control mechanism.

2. In a telegraph transmitter, an operating shaft capable of cyclic rotation incident to each transmitting operation, a rotatable worm, a pawl and ratchet mechanism for receiving motion from said shaft and imparting it to said worm, a pair of alarm signal controlling contacts, and a contact operating member movable by said worm.

3. The combination set forth in claim 2 including a release member for disassociating said member from said worm in response to a predetermined control signal for permitting the return of said member to starting position.

4. In a keyboard device, a plurality of keylevers, a common operating mechanism responsive by a single revolution to the manipulation of each of said keylevers, a registering mechanism operative to receive reciprocative impulses from said operating mechanism and translate them cumulatively, a pair of signal control contacts, and means carried by said registering mechanism for acting upon said contacts when a predetermined amount of cumulative operation has been consummated.

5. In a telegraph unit, a manually controlled transmitting apparatus, a signal controlled receiving apparatus, a printing machine under control of said receiving and transmitting apparatuses including a shaft rotatable cyclically with each printing operation, a lever receiving oscillatory motion from said shaft, a worm, a pawl and ratchet mechanism for translating the oscillatory motion of said lever to a rotary motion for said worm, and an alarm circuit controlling member including means progressively movable by said worm.

6. The combination set forth in claim 5 including means controllable by said transmitting or receiving apparatus for restoring said member to a starting position.

7. An operation recording mechanism, including a pawl carried upon a subjective mechanism, a recording shaft, a ratchet wheel carried by said shaft and acted upon by said pawl for rotating it thereby, a worm rotatable with said shaft, a follower pivoted perpendicularly to said shaft having a free end spring urged to engage the threads of said worm and be moved from a normal position thereby, a spring for returning said follower to normal position, and a signal control switch supported adjustably in the path of said follower for effecting a premonitory signal by the predetermined engagement of said follower therewith.

8. A telegraph apparatus comprising an intermittently rotating part, an element rotated step by step by each operation of said part, means cooperating with said element and moved longitudinally thereof by the rotation of said element, and signal means controlled by said cooperating means for indicating a predetermined condition.

9. A telegraph apparatus comprising an intermittently rotating part, a cam rotated with said part, a worm member rotated step by step by each rotation of said cam, means cooperating with said worm member and moved longitudinally thereby on the rotation thereof, and a signal device controlled by said means to denote its arrival at a predetermined position.

10. A telegraph apparatus comprising an intermittently rotating part, a cam rotated with said part, a worm member rotated step by step for each rotation of said cam, means cooperating with said worm member and moved in a lineal direction on the rotation thereof, a signal means controlled by said means when it is moved to a predetermined position through the rotation of said worm member, and means effective for disengaging said cooperating means from said worm element and permitting its restoration to normal.

11. A telegraph apparatus comprising a mechanism for the transmission of electrical impulses representative of characters, a worm element rotated step by step by each operation of said mechanism, means cooperating with said mechanism and moved in a lineal direction on the rotation of said element, and an alarm index controlled by said last mentioned means for indicating the consummated transmission of impulses representative of a predetermined number of characters.

12. A printing telegraph apparatus comprising a typing unit and a keyboard transmitting unit, means for illuminating the medium on which the characters are printed, an intermittently rotating part, an element operated for each operation of said part, means cooperating with said element and moved in response to the operation of said element, and means controlled by said last mentioned means for controlling the operation of said illuminating means to indicate a predetermined condition.

13. A telegraph apparatus comprising a selector unit, an intermittently rotating part effective for controlling the operation of said selecting unit, a worm operated progressively upon each operation of said part, parallel motion means cooperating with said worm, and a signal device controlled by said means for indicating a predetermined amount of operation.

14. In a telegraph apparatus including a keyboard transmitting mechanism, a receiving mechanism, and a printing mechanism subject to the control of said keyboard and said receiving mechanisms, the combination with a cyclically operating shaft associated with said printing mechanism, of a signal recording apparatus comprising a cam carried by said shaft, a pawl receiving reciprocal motion from said cam, a subordinated shaft including a ratchet movable by said pawl and a feed worm, a follower lever having a projection engageable within the threads of and spring urged into engagement with said worm, a pair of contacts disposed in the path of said lever and engageable thereby after predetermined advancement of said lever by said worm, and an alarm circuit completed by the engagement of said contactors for indicating the consummation of a predetermined number of printing operations as interpreted by the progress of said subordinated shaft.

15. In a printing unit a signal transmitting mechanism, a signal receiving mechanism, and a printing mechanism subject to the control of each said transmitting and receiving mechanisms, means for illuminating the matter printed by said printing mechanism having a predetermined operating condition, and a registering device responsive to a predetermined number of operations of said printing mechanism for altering said predetermined operating condition of said lighting means, thereby effecting a signal indicative of the consummation of said predetermined number of operations.

16. In a printing telegraph apparatus, a cyclically operated element, a worm, means for imparting a cumulative motion to said worm under the actuation of said element, a premonitory alarm device, and means selectively presentable into and withdrawable from the groove of said worm for conditioning said device after predetermined progress of said worm.

17. In a printing telegraph apparatus, a premonitory alarm device, means for conditioning said device including a screw for cumulatively receiving successive mechanical impulses coincident with each signal operation, and an alarm conditioning element comprising a portion advanced by the cumulative action of said member to a predetermined position whence said portion functions to actuate said alarm device.

HOWARD L. KRUM.
ALBERT H. REIBER.